United States Patent [19]

Seike et al.

[11] Patent Number: 5,104,021
[45] Date of Patent: Apr. 14, 1992

[54] OPTICAL FIBER CUTTING APPARATUS AND METHOD

[75] Inventors: Takeo Seike; Osamu Nishi, both of Kanagawa, Japan

[73] Assignee: Sumitomo Electric Industries, Ltd., Osaka, Japan

[21] Appl. No.: 486,226

[22] Filed: Feb. 28, 1990

[30] Foreign Application Priority Data

Mar. 11, 1989 [JP] Japan .................. 1-58773

[51] Int. Cl.⁵ .............................. C03B 37/16
[52] U.S. Cl. ........................ 225/2; 225/96.5
[58] Field of Search .............. 225/2, 4, 72, 73, 74, 225/96.5, 103

[56] References Cited

U.S. PATENT DOCUMENTS

| | | | |
|---|---|---|---|
| 4,216,004 | 8/1980 | Brehm et al. | 65/2 |
| 4,473,942 | 10/1984 | Ridgway | 29/869 |
| 4,565,310 | 1/1986 | Krause | 225/2 |
| 5,024,363 | 6/1991 | Suda et al. | 225/96.5 |

FOREIGN PATENT DOCUMENTS

| | | |
|---|---|---|
| 089845 | 3/1983 | European Pat. Off. |
| 278573 | 2/1988 | European Pat. Off. |
| 295374 | 3/1988 | European Pat. Off. |
| 0159709 | 8/1985 | Japan .................. 225/103 |

OTHER PUBLICATIONS

Fujikura Densen K. K., Cutter of Optical Fiber, Patent Abstracts of Japan, vol. 10, No. 38 (P-428) [2095], 14th Feb. 1986; & JP-A-60 184 207.

Sumitomo Electric Ind. Ltd., Cutting Tool for Optical Fiber, Patent Abstracts of Japan, vol. 10, No. 348 (P-519) [2404], 22nd Nov. 1986; & JP-A-61 148 407.

Primary Examiner—Douglas D. Watts
Assistant Examiner—John M. Husar
Attorney, Agent, or Firm—Cushman, Darby & Cushman

[57] ABSTRACT

The invention is an apparatus and method for cutting optical fibers including a pair of slip-grasping clamps arranged to grasp an exposed optical fiber between them such that a slip-grasping force on the optical fiber is maintained constant. An injuring edge is urged against the optical fiber at a point between the two clamps to initially injure the optical fiber. A pressing block is then urged against the optical fiber from a side opposite the initial injury so that tension is exerted on the optical fiber by the slip-grasping force of the clamps, thereby cutting the fiber.

17 Claims, 3 Drawing Sheets

OPTICAL FIBER CUTTING APPARATUS AND METHOD

BACKGROUND OF THE INVENTION

The present invention relates to an apparatus and method for cutting an optical fiber so as to form a mirror cut end surface which is perpendicular to the longitudinal axis of the optical fiber, when the optical fiber is subject to connection, measurement, or the like.

FIG. 7 (PRIOR ART) shows a conventional optical fiber cutter. In the optical cutter, an upper casing 76 and a lower casing 71 are provided so as to be in opposition to each other and so as to be pivotal relative to each other through a pin 72. A flat spring 77 for mounting an optical fiber thereon is attached at one end to the lower casing 71. An optical fiber pressing member 75 attached at one end to the upper casing 76 is provided above the flat spring 77. A cutter arm 73 is rotatably attached at a base end to a center of the pin 72 and a free end of the cutter arm 73 extends under an end of the upper casing 76 and is provided with an injuring edge 74.

To operate the conventional apparatus, the coating of a coated optical fiber is removed at its end. The optical fiber is mounted on the flat spring 77 and the exposed optical fiber is pressed by the pressing member 75 so that it is held in position. If the free end of the upper casing 76 is pushed down, the injuring edge 74 moves down so as to initially injure the optical fiber mounted on the flat spring 77. The pressure exerted on the upper casing 76 is removed and then the flat spring 77 is bent to a position where it abuts a stop 78, so that the bending stress acts to cut the optical fiber at the position of the initial injury.

In such an optical fiber cutter, however, skill is required to cut an optical fiber so as to form a mirror cut end surface which is perpendicular to the longitudinal axis of the optical fiber, because the injuring edge makes an arcuate motion and the flat spring is supported in the form of a cantilever.

FIG. 8 (PRIOR ART) is a diagram of an alternative conventional cutter. A coated optical fiber 1 is grasped by a clamp 81 which is provided at its grasping surface with an elastic material 81a. An end portion of an exposed optical fiber 2 of the coated optical fiber 1 is grasped by another clamp 82 which is also provided at its grasping surface with an elastic material 82a, so that the optical fiber 2 is grasped substantially horizontally in the air between the clamps 81 and 82. In this state, an injuring edge 83 is urged against the optical fiber 2 so as to initially injure the optical fiber 2. Then, a pressing block 84 is pressed against the optical fiber 2 from the side opposite the initial injury so as to exert tension to the optical fiber 2, thereby cutting the optical fiber 2.

In such a cutter, however, there has been a problem in that the clamp 81 grasps the coated optical fiber 1 while the clamp 82 grasps the exposed optical fiber 2, and the grasping force varies in accordance with the clamping force of the clamps 81 and 82, so that the slip-grasping force of the clamps 81 and 82 is not constant. Thus, the depth of the initial injury and the tension exerted on the optical fiber 2 at the time of cutting vary, making it difficult to cut the optical fiber 2 so that a mirror cut end surface which is perpendicular to the longitudinal axis of the optical fiber 2 is formed.

SUMMARY OF THE INVENTION

It is therefore an object of the present invention to solve the above problems in the prior art.

In order to attain the above object, the present invention provides an optical fiber cutting apparatus comprising a pair of slip-grasping clamps arranged to grasp an exposed optical fiber between them; an injuring edge which can be urged against the optical fiber portion at a point between the two clamps to initially injure the optical fiber portion; and a pressing block which ca be urged against the optical fiber from the side opposite the initial injury so that tension is exerted on the optical fiber by the slip-grasping force of the clamps, thereby cutting the fiber.

Further, the invention provides an optical fiber cutting method comprising the steps of: removing a coating at an end portion of a coated optical fiber to expose an optical fiber; slip-grasping the exposed optical fiber in the air; urging an injuring edge against the optical fiber at a position between the points where the optical fiber is slip-grasped so as to initially injure the optical fiber in a surface portion thereof; and urging a flat pressing block against the optical fiber from the side opposite the initial injury so that tension is exerted on the optical fiber portion by the slip-grasping force, thereby cutting the optical fiber portion.

With the foregoing in mind, other objects, features and advantages of the present invention will become more apparent upon consideration of the following description and the appended claims with reference to the accompanying drawings, all of which form part of this specification, wherein like reference numerals designate corresponding parts in the various figures.

DETAILED DESCRIPTION OF THE PREFERRED EMBODIMENTS

FIGS. 1(A) through 1(D) explain the fundamental procedure of the optical fiber cutting method according to the present invention.

A coating of a coated optical fiber 1 is removed at an end portion thereof to expose an optical fiber 2. The exposed optical fiber 2 is slippably grasped substantially horizontally in the air by a pair of clamps 3 which are arranged so as to make their slip-grasping force constant, as will be described later.

Figure 1A:
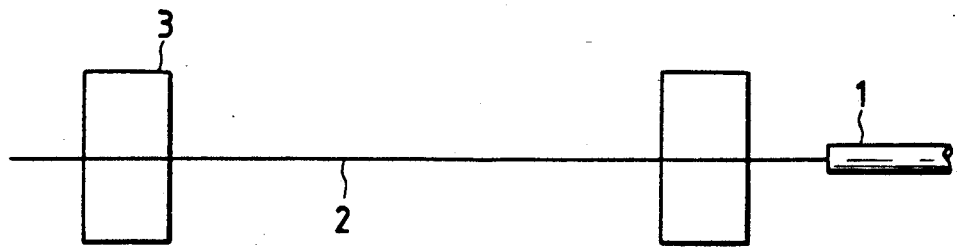
FIGS. 1(A) through 1(D) are diagrammatic views of the fundamental procedure of the optical fiber cutting method according to the present invention.
Figure 1B:
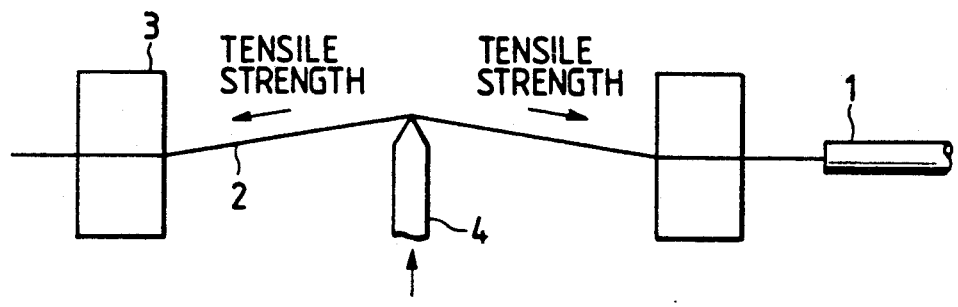

Next, as shown in FIG. 1(B), an injuring edge 4 is urged vertically against the optical fiber 2 at a position between the clamps 3. At this time, the clamps 3 slip-grasp the optical fiber 2 so as to exert tension into the optical fiber 2 in the directions as indicated by arrows so that the optical fiber 2 is finely injured at the position contacting the injuring edge 4.

Figure 1C:
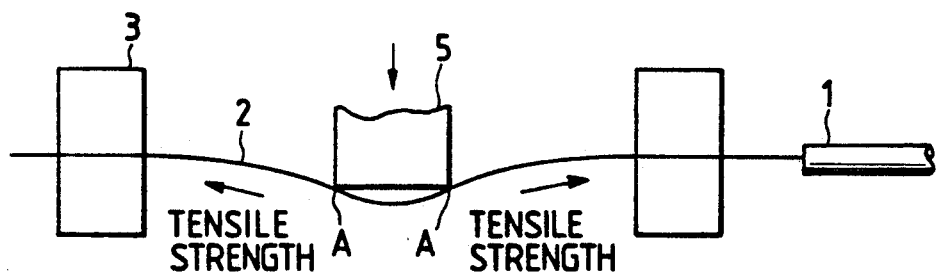
Figure 1D:
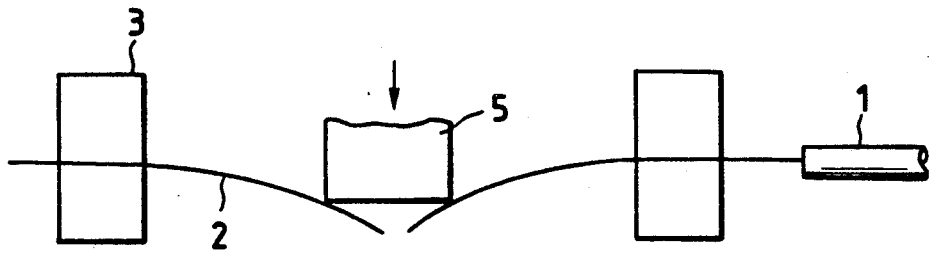

After the injuring edge 4 is retreated, a pressing block 5 having a flat surface is urged against the optical fiber 2 from a side opposite the initial injury, as shown in FIG. 1(C). When the pressing block 5 is urged against the optical fiber 2, a bending force due to the bending in the air of the optical fiber 2 between support points A of the optical fiber 2 is exerted on the optical fiber 2, while tension due to the slip-grasping by the clamps 3 is exerted on the optical fiber 2. Thus, the optical fiber 2 is cut at the position of the initial injury as shown in FIG. 1(D), so as to form a mirror cut end surface which is perpendicular to the longitudinal axis of the optical fiber 2.

Figure 2:
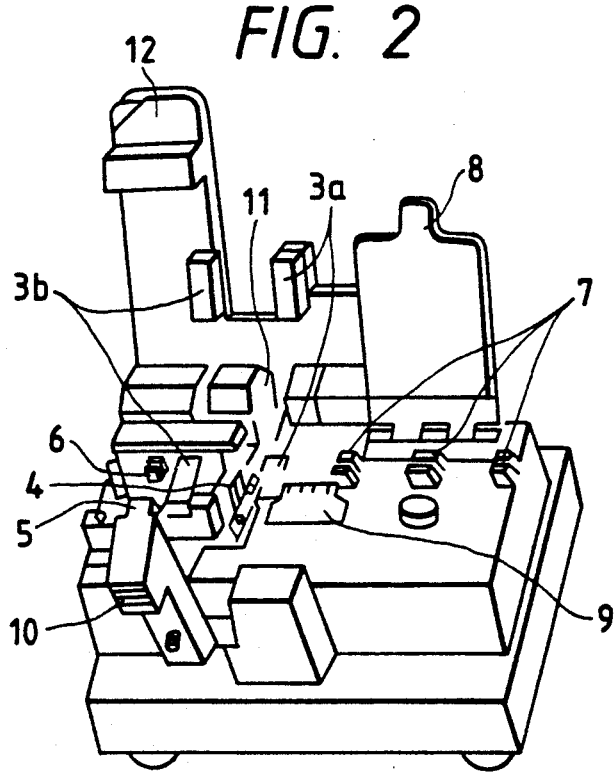
FIG. 2 is a perspective view of an apparatus for cutting optical fibers according to the present invention.

FIG. 2 shows one embodiment of the apparatus for realizing the optical fiber cutting method according to the present invention. The optical fiber is not shown set in the apparatus.

In order to make a curled coated optical fiber straight, an end of an optical fiber portion of the coated optical fiber is mounted on an optical fiber guide 6 and the coated optical fiber is mounted on coated fiber guides 7. Then, a coated clamp 8 is brought down so as to temporarily fix the coated optical fiber at the coated optical fiber guides 7. Next, a clamp cover 12 is brought down so that the optical fiber is grasped substantially horizontally in the air by a pair of clamps 3a and 3b capable of slip-grasping the optical fiber.

If a knob 11 formed integrally with the injuring edge 4 is pushed, the injuring edge 4 is rotated to move in a direction vertical to the optical fiber grasped in the air so that the injuring edge 4 is urged against the optical fiber. As a result, tension is exerted on the optical fiber by the slip-grasping clamps 3a and 3b so that an initial injury is formed in the optical fiber at its contacting portion with the injuring edge 4.

After the injuring edge 4 has been returned to its original position, a pressing block knob 10 connected to the pressing block 5 having a flat surface with no curvature is pushed down so that the tension due to the slip-grasping and bending force are exerted on the optical fiber to thereby cut the optical fiber.

Further, it is possible to cut the fiber to a desired length by positioning the exposed end of the optical fiber with a cutting length scale plate 9 on which numerical values for cutting length are clearly marked.

Figure 3A:
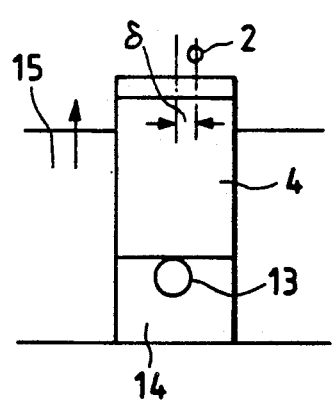
FIGS. 3(A) and 3(B) are front and side views of an injuring edge fixing portion according to the present invention.
Figure 3B:
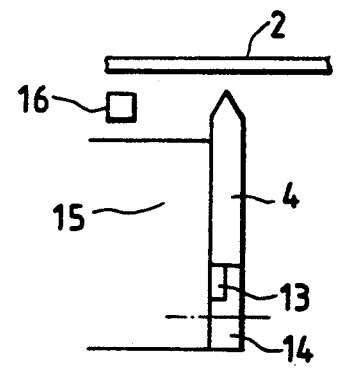

FIGS. 3(A) and 3(B) are front and side views, respectively, which show an embodiment of the injuring edge mounting. The optical fiber 2 is set so that it is displaced by a distance δ from the center of the injuring edge 4. This allows the injuring edge 4 to be removed from an edge fixing block 15 and attached thereon again with its front and rear surfaces reversed, thereby utilizing an unused portion of the injuring edge 4 and doubling the life of one injuring edge as compared to a conventional injuring edge.

Further, the edge fixing block 15 is provided with a positioning pin 13 and a groove 14 for positioning the injuring edge 4. When the edge fixing block 15 is moved vertically to injure the optical fiber 2, the edge fixing block 15 abuts an adjustable stopper 16 after the injuring edge 4 has contacted the optical fiber 2, so that an edge urging amount can be made constant.

The relation between the edge urging amount Y and the slipping force (the tension exerted on the optical fiber) P due to the slip-grasping of the optical fiber is represented by the following equation:

$$Y = a \times \frac{W}{P}$$

Here, W represents edge pressure, which is a factor for determining the injury of the optical fiber, and a represents a constant. Accordingly, it is important to stabilize the edge urging amount.

The slipping force P, on the other hand, is determined by the clamping force of the clamps 3 and the frictional force between the clamps 3 and the optical fiber 2. It is desirable that the optical fiber 2 is not damaged except at the point where the cut is to be made. Accordingly, it is preferable that all the portions of the clamps 3 which come in contact with the optical fiber 2 are formed of a soft material. An elastic material such as a rubber material or the like is therefore used at the contacting portions.

Figure 4:
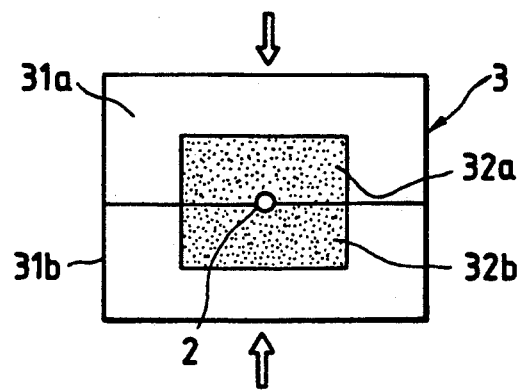
FIG. 4 is a front view of a clamping portion according to the present invention.

FIG. 4 is a front view showing a specific example of each clamp 3 in which the clamping force and frictional force of the clamp 3 are stabilized and the contacting portion of the clamp 3 contacting the optical fiber portion 2 is formed of an elastic material. The clamp 3 is constituted by a pair of clamp members 31a and 31b formed of channel-shaped rigid bodies filled with elastic materials 32a and 32b, respectively. The pair of clamp members 31a and 31b are disposed with their channels facing each other. A pressing force, which can be a magnetic force, is applied to the pair of clamp members 31a and 31b to make the surfaces of the clamp members contact each other so that the slipping force exerted on the optical fiber 2 can be made constant.

Figure 5:
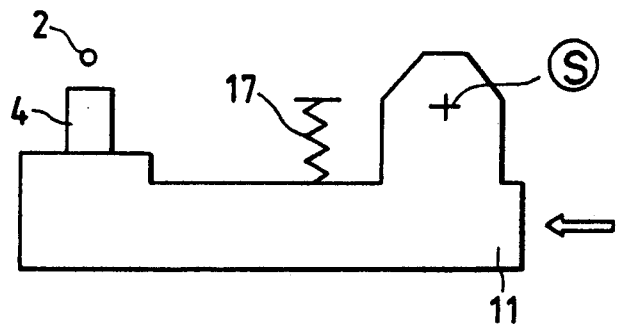
FIG. 5 is a diagrammatic view of an edge urging structure according to the present invention.

FIG. 5 shows one embodiment of the edge urging configuration. An edge urging knob 11 is pushed in the direction of the arrow so that the edge urging knob 11 rotates about a shaft S so as to vertically urge the injuring edge 4 against the optical fiber 2. A spring 17 is provided so that when the knob 11 is released, the injuring edge 4 automatically retreats, ending the edge urging operation. This prevents the optical fiber 2 from being injured at more than one point. Performing the edge urging operation rapidly by tapping the edge urging knob 11 will result in a sharp crack forming at a front end of the injury in the optical fiber 2, thereby making the cutting angle more approximate a right angle.

Figure 6:
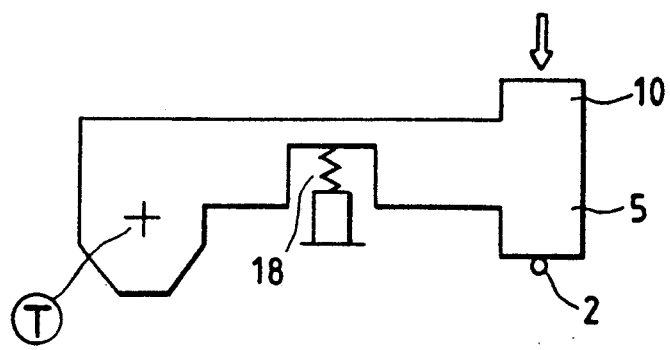
FIG. 6 is a diagrammatic view of a pressing block urging structure according to the present invention.
Figure 7:
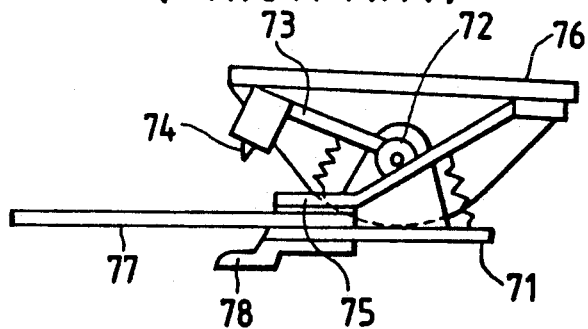
FIG. 7 (Prior Art) is a perspective view of a conventional optical fiber cutter.
Figure 8:
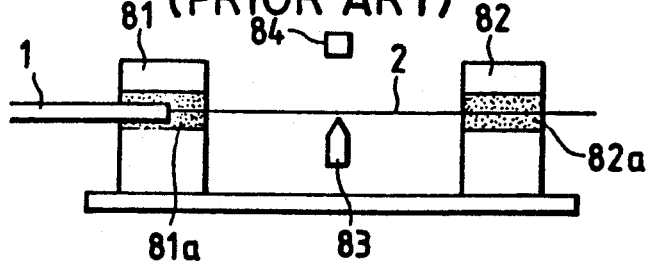
FIG. 8 (Prior Art) is a diagrammatic view of an alternative conventional optical fiber cutter.

FIG. 6 shows how the pressing block knob 10 is pushed so that the pressing block 5 presses the optical fiber 2. When pushed, the pressing block knob 10 rotates about a shaft T, and the pressing block 5 is urged against the optical fiber 2. A compression spring or damper 18 is provided in a manner such that the optical fiber pushing speed is reduced, thereby stabilizing the bending force exerted to the optical fiber 2 and resulting in mirror surface cutting.

The optical fiber cutting apparatus and method according to the present invention can cut an optical fiber so as to form a mirror cut end surface which is perpendicular to the longitudinal axis of the optical fiber. This reduces the connection loss when connecting an optical fiber or the like. The apparatus and method also reduces variations due to the skill of a person in comparison with the conventional method.

While the invention has been described in accordance with what is presently conceived to be the most practical and preferred embodiment, it is to be understood that the invention is not to be limited to the disclosed embodiment but on the contrary, is intended to cover various modifications and equivalent arrangements included within the spirit and the scope of the appended claims, which scope is to be accorded the broadest interpretation of such claims so as to encompass all such equivalent structures

What is claimed is:

1. An optical fiber cutting apparatus comprising:
    a pair of slip-grasping clamps arranged to grasp an exposed optical fiber between them, a slip-grasping force on the optical fiber being maintained constant in each clamp, each of the clamps comprising a pair of opposed channel-shaped rigid bodies, each channel-shaped rigid body including an elastic portion positioned in the channel which contacts the optical fiber to provide the slip-grasping force, each elastic portion firmly stabilized by the respective surrounding channel;
    an injuring edge which can be urged in a radial direction against said optical fiber at a point between said two clamps to initially injure said optical fiber; and
    a pressing block which can be urged in a radial direction against said optical fiber from a side opposite the initial injury and in a direction substantially perpendicular to a longitudinal axis of said optical fiber, so that tension is exerted on said optical fiber by said slip-grasping force of said clamps, thereby cutting said fiber.

2. An apparatus according to claim 1, wherein respective portions of the opposed rigid bodies contact each other when the clamp is closed.

3. An apparatus according to claim 1, wherein a constant clamping force is maintained on the two opposed rigid bodies when the clamp is closed.

4. An apparatus according to claim 3, wherein the constant clamping force is provided by a magnetic force.

5. An apparatus according to claim 1, wherein the amount of urging of the injuring edge against the optical fiber is made constant 6. An apparatus according to claim 5, wherein the urging of the injuring edge against the optical fiber is made constant by stop means.

7. An apparatus according to claim 6, wherein the stop means are adjustable.

8. An apparatus according to claim 1, wherein the urging of the injuring edge against the optical fiber is done rapidly by using spring means.

9. An apparatus according to claim 1, wherein the injuring edge contacts the optical fiber generally perpendicularly.

10. An apparatus according to claim 1, wherein the pressing block has a flat surface which contacts the optical fiber.

11. An apparatus according to claim 1, wherein the pressing of the pressing block against the optical fiber is done slowly by using spring means.

12. An apparatus according to claim 1, wherein the pressing of the pressing block against the optical fiber is done slowly by using damping means.

13. An apparatus according to claim 1, wherein the injuring edge can be positioned to expose a new injuring surface to the optical fiber.

14. An optical fiber cutting method comprising the steps of:
    removing a coating at an end portion of a coated optical fiber to expose the optical fiber;
    slip-grasping the exposed optical fiber at said end portion in the air at two grasping points, said slip-grasping force at each point being constant;
    urging an inuring edge in a radial direction against said optical fiber at a position between the grasping points so as to give an initial injury to said optical fiber; and
    urging a flat pressing block in a radial direction against said optical fiber from a side opposite said initial injury and in a direction substantially perpendicular to a longitudinal axis of said optical fiber, so that tension is exerted on said optical fiber by said slip-grasping force at each grasping point to cut said optical fiber.

15. An optical fiber cutting method according to claim 14, wherein an amount of urging of the injuring edge against the optical fiber is made constant.

16. An optical fiber cutting method according to claim 14, wherein the urging of the injuring edge against the optical fiber is rapidly performed.

17. An optical fiber cutting method according to claim 14, wherein the pressing of the pressing block against the optical fiber is slowly performed.

* * * * *